United States Patent
Hilario (10) Patent No.: US 7,052,225 B2
(45) Date of Patent: May 30, 2006

(54) APPARATUS FOR HANDLING MASS PRODUCED WORK PIECES

(75) Inventor: Frederick C. Hilario, Cavite (PH)

(73) Assignee: Intel Corporation, Santa Clara, CA (US)

( * ) Notice: Subject to any disclaimer, the term of this patent is extended or adjusted under 35 U.S.C. 154(b) by 140 days.

(21) Appl. No.: 10/012,342

(22) Filed: Dec. 12, 2001

(65) Prior Publication Data

US 2003/0108408 A1    Jun. 12, 2003

(51) Int. Cl.
*B65H 1/00*    (2006.01)

(52) U.S. Cl. .................. 414/222.01; 414/219

(58) Field of Classification Search ............... 414/219, 414/222.01, 223, 225.01, 419, 627; 198/403, 198/408; 249/68
See application file for complete search history.

(56) References Cited

U.S. PATENT DOCUMENTS

| | | | | |
|---|---|---|---|---|
| 1,887,211 A | * | 11/1932 | Mortimer | 198/471.1 |
| 4,372,802 A | * | 2/1983 | Harigane et al. | 156/538 |
| 4,556,362 A | * | 12/1985 | Bahnck et al. | 414/744.3 |
| 4,626,167 A | * | 12/1986 | Bond et al. | 414/806 |
| 4,749,329 A | * | 6/1988 | Stout | 414/627 |
| 5,121,052 A | * | 6/1992 | Nickerson | 324/754 |
| 5,622,025 A | * | 4/1997 | Kitagawa et al. | 53/53 |
| 5,888,127 A | * | 3/1999 | Piper et al. | 451/287 |
| 6,019,564 A | * | 2/2000 | Kiyokawa et al. | 414/223.01 |
| 6,364,089 B1 | * | 4/2002 | Singh et al. | 198/408 |
| 6,449,531 B1 | * | 9/2002 | Gune et al. | 700/218 |

* cited by examiner

*Primary Examiner*—Eileen D. Lillis
*Assistant Examiner*—Charles A. Fox
(74) *Attorney, Agent, or Firm*—Schwegman, Lundberg, Woessner & Kluth, P.A.

(57) ABSTRACT

A high speed device and method for transporting work pieces from one container to another is disclosed. This high speed device utilizes a rotary wheel having a number of pick heads located along the circumference of the rotary wheel. These pick heads are utilized to lift work pieces from a container. The rotary wheel then rotates to position the next pick heads over the next workpiece which it then picks up. Once all work pieces in a container are picked up they may then be deposited in a similar manner in a receiving container. This device and method reduces the time involved in moving work pieces and reduces the cost of manufacturing.

22 Claims, 6 Drawing Sheets

APPARATUS FOR HANDLING MASS PRODUCED WORK PIECES

FIELD

The invention relates to a device and method for handling mass produced work pieces. More particularly, the present invention is a device and method for the rapid picking and placing of work pieces from one tray to another.

BACKGROUND

In the rapid development of industrial automation great progress has been made in the mass production of products. Starting with the concept of the assembly line, today's factories have advanced where high-quality complex products can be mass produced. However, even when an assembly line is utilized and the workpiece travels from one workstation to another at which further processing occurs to the work piece at each station, it is still frequently necessary to physically move the work piece from a conveyor belt to a tooling machine or from one type of tray to another for cleaning or testing of the work piece. Therefore, one critical operation in a factory environment is the ability to move work pieces as quickly as possible from one station to the next, or from the assembly line to the tooling machine, or from one tray to another without damaging the work piece.

In the early days of manufacturing the movement of work pieces was frequently done by human workers. Of course, this was frequently difficult, dangerous and time-consuming work. With the advent of the industrial robots a significant improvement in the movement of work pieces was achieved since the robot could be programmed to endlessly pickup and move work pieces. However, even though a robot could pickup and place the work piece faster and more consistently than a human being, it was still a relatively slow process since the robot usually only picked up and placed one work piece at a time.

Therefore, to improve the speed of moving work pieces from one area to another, robot tools were designed to pickup multiple work pieces in a row and placed them down simultaneously in a row. However, in chip manufacturing often chips are placed in nests/trays that contain several rows and several columns of individual chips. Often these chips must be moved from a nest in which some process, such as cleaning, has been performed to a tray for further processing, testing or packaging for shipment. If the nest or tray has six rows and ten columns and the robot tools can move six chips, or one row, at a time then the robot must make ten round trips to move all the chips in a nest to a tray. Even though robots may be designed for rapid movement, so many round trips would add a great deal to the manufacturing time when considering that tens of thousands of chips are continuously being output by a single assembly line in a factory.

Therefore, what is needed is a device and method that can efficiently move an entire tray of chips or work pieces. This device and method should reduce manufacturing costs by reducing the amount of time it takes to manufacture an item.

BRIEF DESCRIPTION OF THE DRAWINGS

The foregoing and a better understanding of the present invention will become apparent from the following detailed description of exemplary embodiments and the claims when read in connection with the accompanying drawings, all forming a part of the disclosure of this invention. While the foregoing and following written and illustrated disclosure focuses on disclosing example embodiments of the invention, it should be clearly understood that the same is by way of illustration and example only and the invention is not limited thereto. The spirit and scope of the present invention are limited only by the terms of the appended claims.

The following represents brief descriptions of the drawings, wherein.

DETAILED DESCRIPTION

Before beginning a detailed description of the subject invention, mention of the following is in order. When appropriate, like reference numerals and characters may be used to designate identical, corresponding or similar components in differing figure drawings. Further, in the detailed description to follow, exemplary sizes/models/values/ranges may be given, although the present invention is not limited to the same. As a final note, well-known components of computer networks may not be shown within the FIGS. for simplicity of illustration and discussion, and so as not to obscure the invention.

Figure 1:
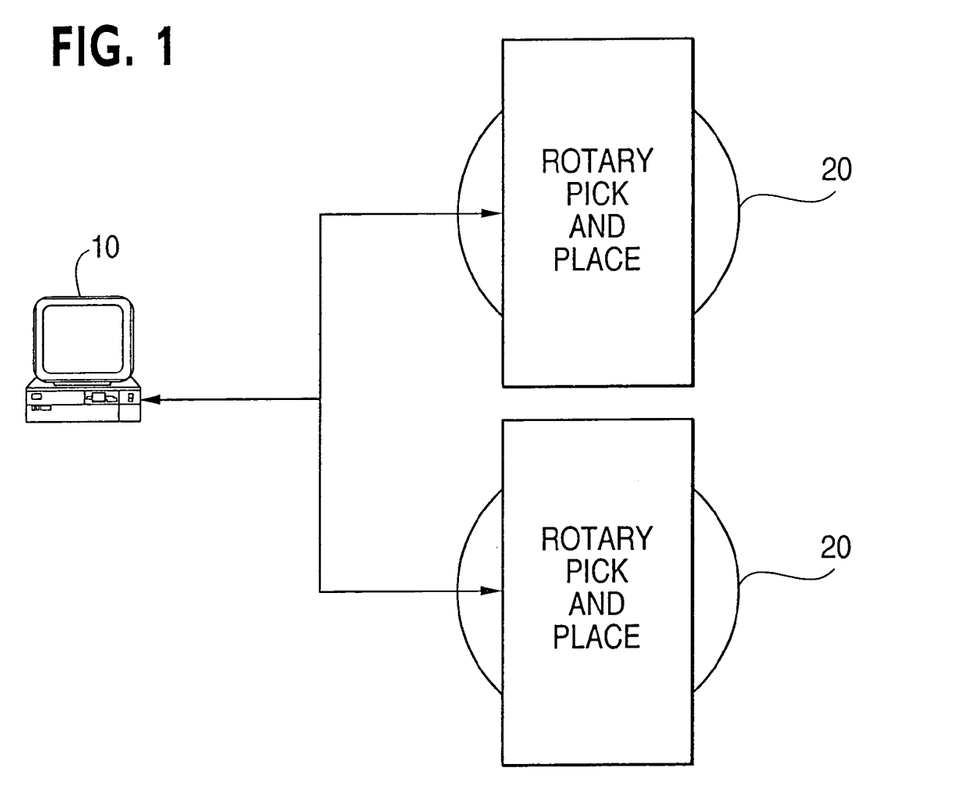
FIG. 1 is an example systems overview of an example embodiment of the present invention.

FIG. 1 is an example systems overview of an example embodiment of the present invention. In this system diagram two rotary pick and place devices 20 are shown connected to a computer system 10. However, as would be appreciated by one of ordinary skill in the art, any number of rotary pick and place devices 20 may be connected to and controlled by computer system 10. In addition, a single computer system 10 or processor may be dedicated to each rotary pick and place device 20. Further, computer system 10 may be an embedded processor in the rotary pick and place device 20. The computer system 10 would execute the logic illustrated and further discussed in detail in reference to FIG. 6.

Figure 2:
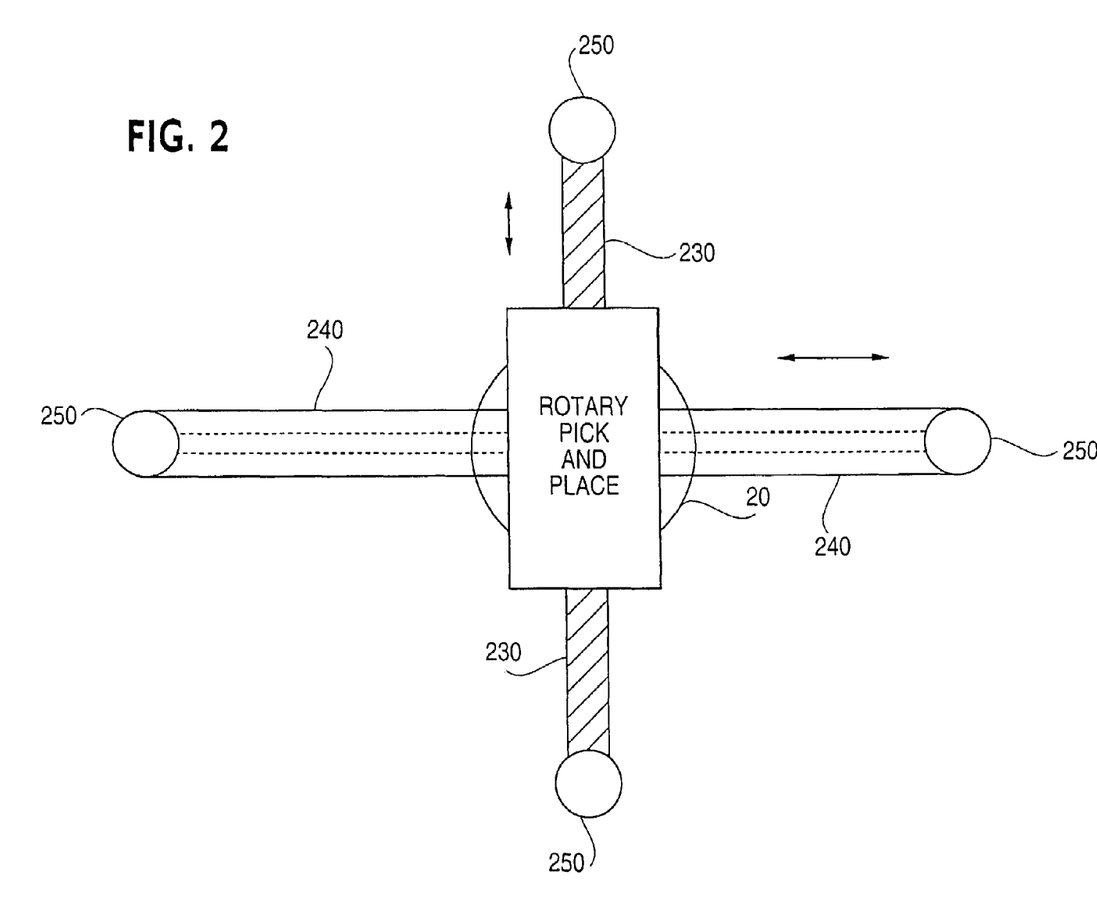
FIG. 2 is a top view of a rotary pick and place device in an example embodiment of the present invention.

FIG. 2 is a top view of a rotary pick and place device 20 in an example embodiment of the present invention. The rotary pick and place device 20 may be supported by up to four supporting members which are affixed from either above or below to a solid surface. It should be noted that screw drive 230 is utilized to move the rotary pick and place device 20 in the y axis while movement arm 240 is utilized to move the rotary pick and place device 20 in the x-axis. It should also be noted that support members 250 connected to screw drive 230 may not be required and the entire structure shown in FIG. 2 may be supported by the supporting members 250 connected to the movement arm 240.

Figure 3:
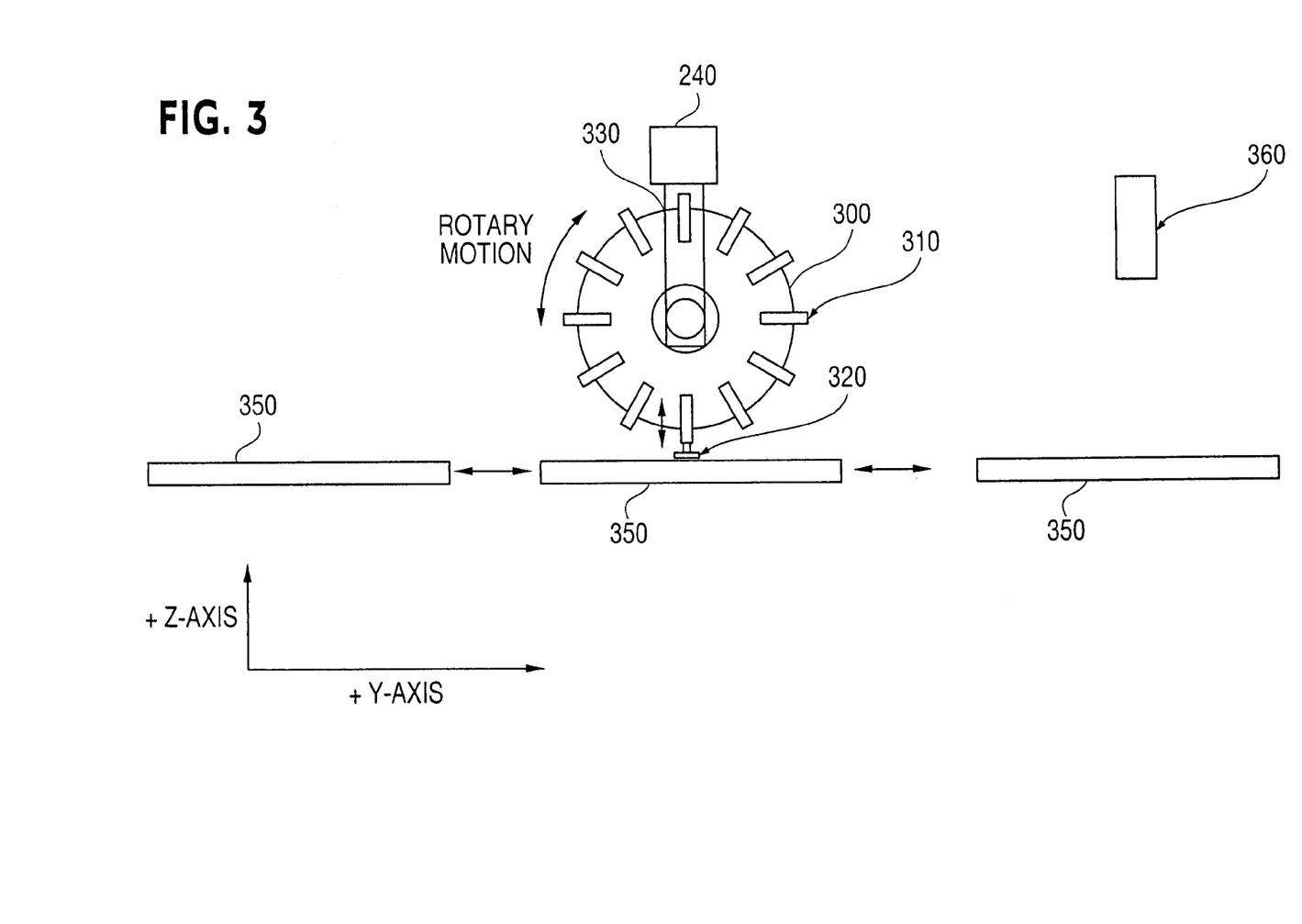
FIG. 3 is a side view of a rotary pick and place device in an example embodiment of the present invention.
Figure 4:
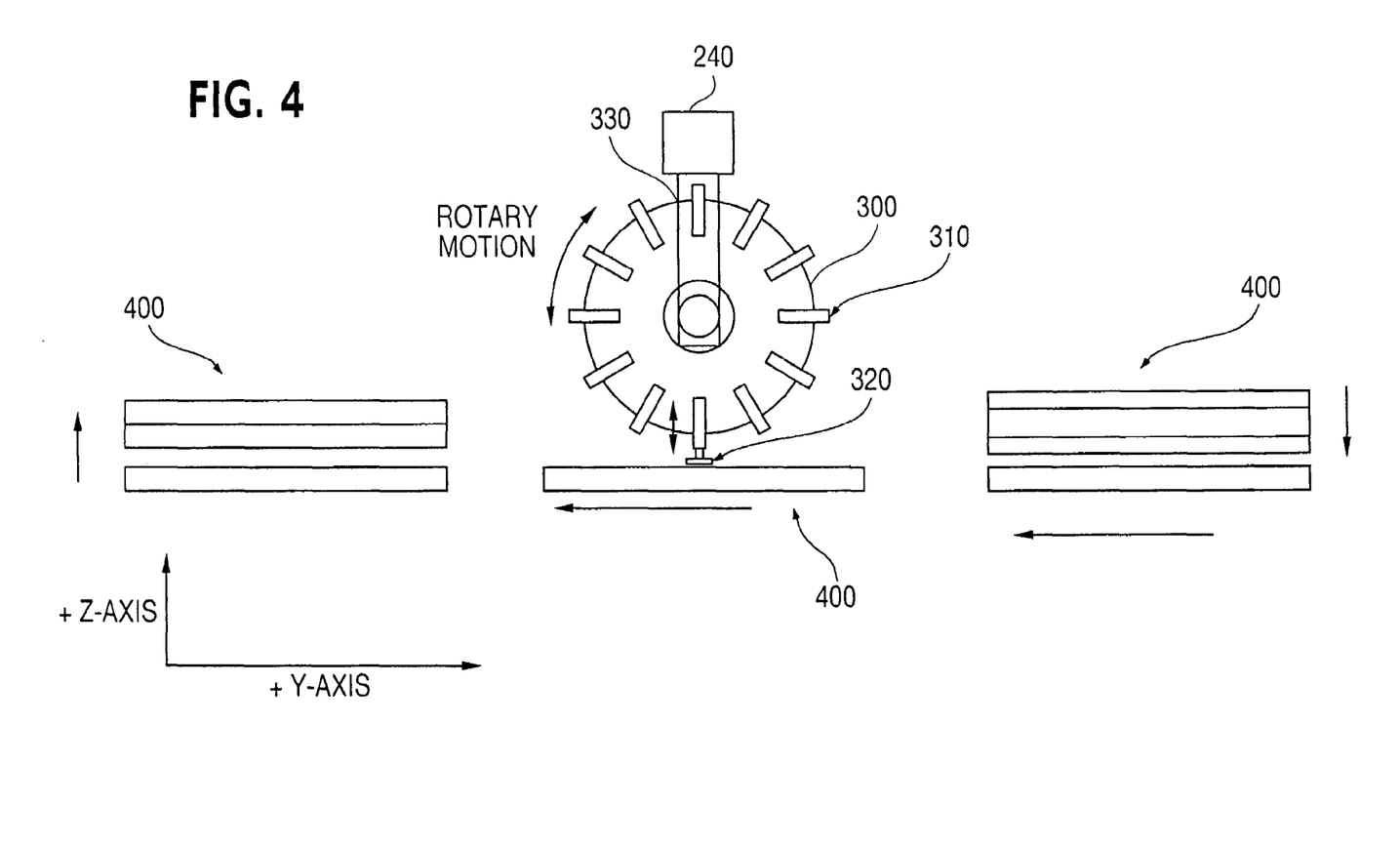
FIG. 4 is a side view of a rotary pick and place device in an example embodiment of the present invention

FIG. 3 is a side view of a rotary pick and place device 20 in an example embodiment of the present invention. In order to simplify FIG. 3 to more clearly illustrate the invention, movement arm 240 is shown without supporting members 250 and screw drive 230 which are depicted in FIG. 2. As shown in FIG. 3, rotary wheel 300 is connected to movement arm 240 via cross member 330. Contained within the outer circumference of rotary wheel 300 are a plurality of pick heads 310. These pick heads 310 are used to pickup work pieces 320 and may comprise any type of grasping tool including a suction device, electromagnetic device, grasping device, etc. The specific type of pick heads 310 used would be directly dependent upon the nature of the work piece 320. For example, it may be preferable in the case where the work pieces 320 are silicon chips for the pick head 310 to be a suction device. Rotary wheel 300 may rotate clockwise or counterclockwise and when a pick head 310 is positioned over a work piece 320 in a nest 350 the pick head 310 would be extended to pickup the work piece 320. The rotary wheel 300 would rotate and be positioned so that the next pick head 310 would be over the next work piece 320. This operation would continue until all the work pieces 320 in a tray 400 and or nest 350 were picked up by the pick heads 310 on the rotary wheel 300. Once all the work pieces 320 have been picked up individually by pick heads 310 from nest 350 the work pieces 320 may be moved to another nest 350 or a tray 400 for packaging and shipping, as shown in FIG. 4, discussed ahead. The number of pick heads 310 would correspond to the largest nest 350 or tray 400 that the rotary pick and place device 20 could handle. Therefore, if the nest 350 or tray 400 contained six rows and ten columns of work pieces 320, then the rotary wheel 300 would have 60 pick heads 310.

Still referring to FIG. 3, in an alternate embodiment of the present invention, a camera 360 may be provided for inspection of the work pieces located in nest 350 and may optionally be connected to computer system 10, shown in FIG. 1, so that work pieces 320 may be selected for pickup by pick heads 310 dependent upon imperfections detected by camera 360. It should further be noted that nest 350 may be traveling along a conveyor belt while being picked up by the rotary pick and place device 20.

FIG. 4 is a side view of a rotary pick and place device 20 in an example embodiment of the present invention. FIG. 4 is similar to FIG. 3 with the exception that camera 360 is absent and trays 400 are provided so that work pieces 320 may be placed into the trays 400 by the pick and place device 20 using pick heads 310. It should be noted that a portion or an entire tray may be filled utilizing the pick and place device 20 shown in FIG. 4. All remaining elements of FIG. 4 are identical to that in FIG. 3 and will not be discussed further here.

Figure 5:
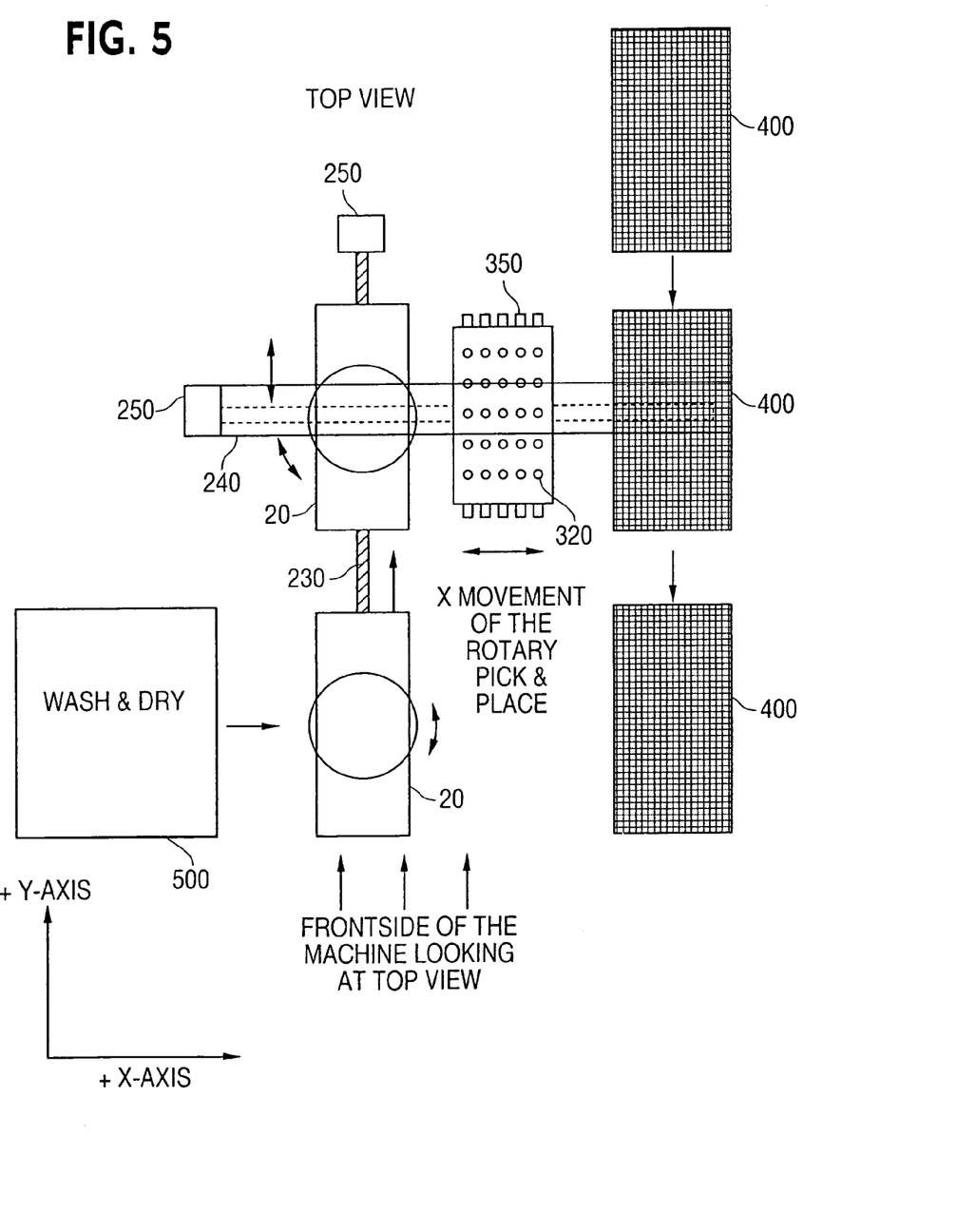
FIG. 5 is a top view of a rotary pick and place device in an example embodiment of the present invention.

FIG. 5 is a top view of a rotary pick and place device 20 in an example embodiment of the present invention. A single rotary pick and place device 20 is shown in two locations in the figure starting next to the wash and dry area 500 and then being moved by the rotary pick and place device 20 to and from the nest 350 and trays 400. Therefore, the rotary pick and place device 20 has a capability of moving both in the y axis, via the screw drive 230, and the x-axis, via the movement arm 240. Again both the screw drive 230 and movement arm 240 are supported by support members 250. This figure is provided to show that the rotary reap pick and place device 20 may move work pieces from a nest to a workstation, such as wash and dry area 500, and back to a tray 400 for further processing or packaging.

Figure 6:
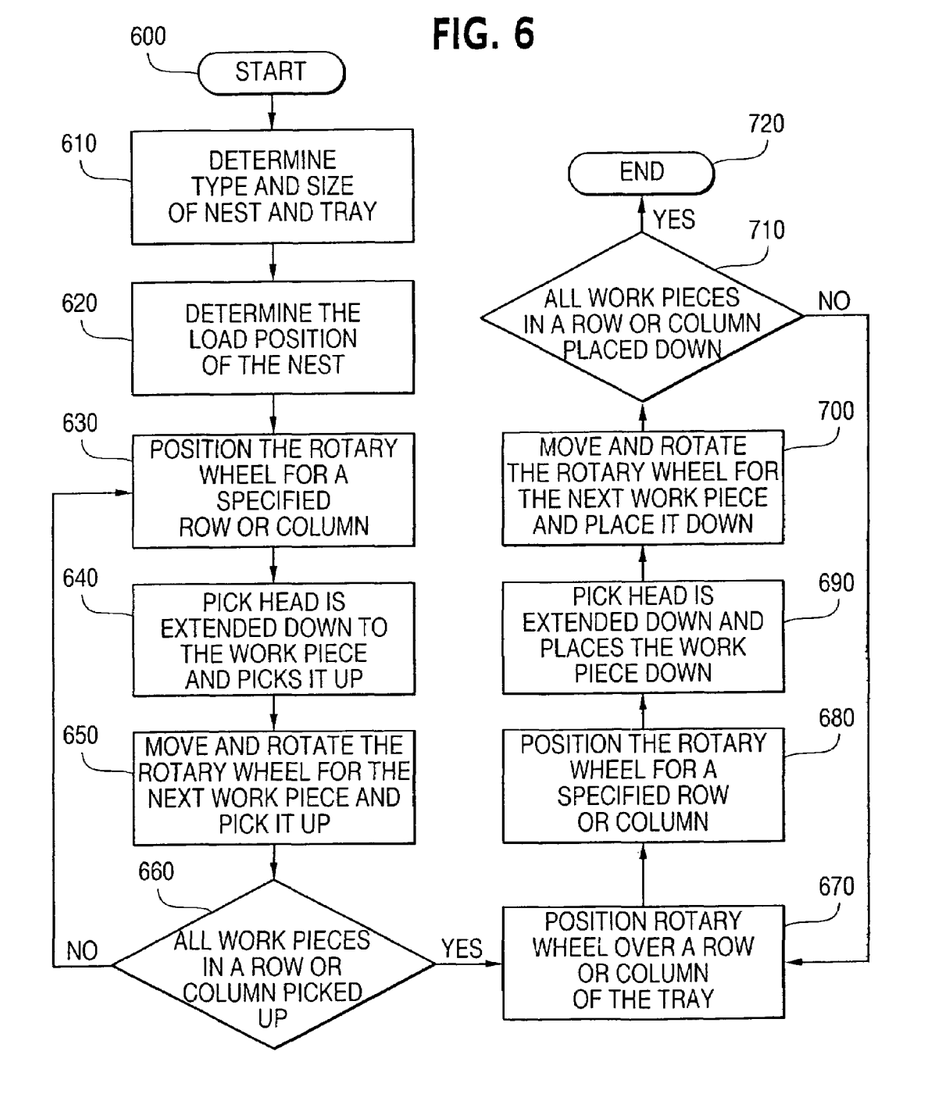
FIG. 6 is an example of the control logic utilized in an example embodiment of the present invention.

Before proceeding into a detailed discussion of the logic used by the embodiments of the present invention it should be mentioned that the flowchart shown in FIG. 6 may contain software, firmware, hardware, processes or operations that correspond, for example, to code, sections of code, instructions, commands, objects, hardware or the like, of a computer program that is embodied, for example, on a storage medium such as floppy disk, CD Rom, EP Rom, RAM, hard disk, etc. Further, the computer program can be written in any language such as, but not limited to, for example C++.

FIG. 6 is an example of the control logic utilized in an example embodiment of the present invention. The control logic shown in this figure would execute in computer system 10, shown in FIG. 1. Processing begins in operation 600 and immediately proceeds to operation 610. In operation 610, the type and size of the nest 350 or tray 400 is determined. This is required in order to position the pick heads 310 over the work pieces 320. Thereafter, processing proceeds to operation 620 where the initial load position of the nest 350 or tray 400 is determined. In operation 630, the rotary wheel 300 is positioned over a specified row and column. Processing then proceeds to operation 640 where a pick head 310 is extended down to the work piece 320 and picks it up. Thereafter, in operation 650 the rotary wheel 300 is rotated clockwise or counterclockwise and simultaneously moved in the x-axis or y-axis direction so that the pick head 310 is located over the next work piece 320 in the row or column of the nest 350 or tray 400. In operation 660 it is determined if all work pieces 320 in a given row or column have been picked up or all work pieces 320 in a tray have been picked up. If all the work pieces 320 in the tray 400 have not been picked up then processing loops back to operation 630.

Still referring to FIG. 6, if all work pieces 320 in a tray 400 or nest 350 have been picked up, then processing proceeds to operation 670. In operation 670, the rotary pick and place device 20 is positioned over a nest 350 or tray 400 that is to receive work pieces 320. As noted in FIGS. 2 and 5, the rotary reap pick and place device would be positioned utilizing screw drive 230 and movement arm 240. Processing then proceeds to operation 680 where the rotary pick and place device 20 is positioned over a specific row or column of the receiving nest 350 or tray 400. In operation 690, a pick head 310 is extended down and releases a work piece 320 into the nest 350 or tray 400. In operation 700, the rotary wheel 300 is rotated and positioned over the next location in the row and column of the nest 350 or tray 400. Further, the work piece 320 is placed down into the nest 350 or tray 400. In operation 710 it is determined whether all the work pieces 320 have been deposited for a given row or colunm and nest 350 or tray 400. If all work pieces 320 have not been deposited in nest 350 or tray 400 from rotary wheel 300 then processing loops back to operation 670. Otherwise processing proceeds to operation 720, where processing terminates.

Still referring to FIG. 6, it should be noted that operations 610 through 660 are utilized to pick up work pieces 320 from, for example, a tray 400 coming down a conveyor belt with the intent of delivering these to a workstation for further processing. Operation 670 through 710 are intended, but not limited to, retrieving the work pieces 320 from the nest 350 or tray 400 after processing has been completed and returning them to the tray 400 for further processing in the assembly line for packaging.

One benefit resulting from the present invention is that a high speed device and method of moving work pieces from one container to another is provided, thereby reducing the amount of time it takes to mass produce work pieces and reducing the cost of manufacturing.

While we have shown and described only a few examples herein, it is understood that numerous changes and modifications as known to those skilled in the art could be made to the example embodiment of the present invention. Therefore, we do not wish to be limited to the details shown and described herein, but intend to cover all such changes and modifications as are encompassed by the scope of the appended claims.

I claim:

1. A rotary pick and place device, comprising:
   a plurality of pick heads, wherein each pick head is used to pick up, hold and release a single work piece from a tray,
   said tray having a predetermined number of work piece positions;
   a rotary wheel having the plurality of pick heads positioned around the circumference of the rotary wheel, the wheel having number of pick heads equal to the number of work piece positions on the tray;
   a movement arm connected to the rotary pick and place device to move the rotary wheel in the x-axis of an XYZ coordinate system;
   a screw drive connected to the rotary pick and place device to move the rotary wheel in the y-axis of an XYZ coordinate system;
   a processor connected to or embedded in the rotary pick and place device and connected to the screw drive, the movement arm, the rotary wheel, and the plurality of pick heads to position and rotate the rotary wheel, and initiate the pick up of and placing down of the work pieces by the pick heads.

2. The device recited in claim 1, wherein the processor will move the rotary wheel by directing the movement arm and screw drive to a specific x-axis and y-axis location in the XYZ coordinate system based upon a tray type for holding work pieces.

3. The device recited in claim 2, wherein the rotary wheel will rotate to position a pick head of the plurality of pick heads over a work piece in the tray upon receipt of signals from the processor.

4. The device recited in claim 3, wherein a pick head of the plurality of the pick heads will extend and grasp or release the work piece upon receipt of signals from the processor.

5. The device recited in claim 1, wherein the tray contains 60 work pieces and the rotary wheel contains 60 pick heads.

6. Apparatus, comprising:
   means for positioning a pick head of a plurality of pick heads carried by a rotatable carrier;
   means for extending the pick head to grasp a work piece from a plurality of workpieces arranged in a tray with a predetermined number of work piece positions;
   means for rotating the rotatable carrier to position another pick head of the plurality of pick heads over another work piece;
   wherein the plurality of pick heads is equal to the number of work piece positions on said tray;
   means for repeating the positioning of the pick head of the plurality of pick heads, the extending of the pick head to grasp the work piece, and rotating the rotatable carrier to position another pick head over another work piece until all work pieces in the tray are picked up by the plurality of pick heads; and
   wherein the means for positioning the pick heads of the rotatable carrier delivers each work piece of the plurality of workpieces from the tray to a further location after the contents of the entire tray are picked up.

7. The apparatus of claim 6, wherein the plurality of work pieces are positioned in a tray and the means for positioning of the pick head of the plurality of pick heads, further comprises:
   means for determining the type and size of the tray; determining a load positioned for the tray; and
   means for moving the rotatable carrier in the x-axis and y-axis of an XYZ coordinate system so that the pick head of the plurality of pick heads is above the work piece in the load position.

8. The apparatus of claim 7, wherein the means for rotating the rotatable carrier to position another pick head of the plurality of pick heads over another work piece in the tray, further comprises:
   means for moving the rotatable carrier in either the x-axis or y-axis direction corresponding to a column or row of the tray so that when the rotatable carrier is rotated, the another pick head of the plurality of pick heads is over the another work piece.

9. The apparatus of claim 8, further comprising:
   means for moving the rotatable carrier in the x-axis and y-axis direction in an XYZ coordinate system;
   means for positioning the rotatable carrier over an empty tray;
   means for extending the pick head of the plurality of pick heads; and
   means for releasing the work piece into the empty tray.

10. Apparatus as recited in claim 9, further comprising:
    means for rotating the rotatable carrier to position another pick head of the plurality of pick heads
    means for positioning the rotatable carrier over another row or column position in the empty tray;
    means for extending the another pick head of the plurality of pick heads releasing the work piece into the empty tray; and repeating the rotating, positioning, extending and releasing until all the plurality of work pieces on the plurality of pick heads have been released into the empty tray.

11. A rotary pick and place device, comprising:
    a plurality of pick heads, each of which is to pick up, hold and release a single work piece of a plurality of work pieces from a tray;
    said tray having a predetermined number of work piece positions;
    a rotatable carrier having the plurality of pick heads positioned thereon, the rotatable carrier having a number of pick heads equal to the number of work pieces positions on the tray;
    a first movement mechanism connected to the rotary pick and place device to move the rotatable carrier in the x-axis of an XYZ coordinate system;
    a second movement mechanism connected to the rotary pick and place device to move the rotatable carrier in the y-axis of an XYZ coordinate system;
    a processor operatively coupled to the first and second movement mechanisms, the rotatable carrier, and the plurality of pick heads to position and rotate the rotatable carrier to initiate the picking up of and placing down of work pieces by the pick heads.

12. The device recited in claim 11, wherein the processor will move the rotatable carrier by directing the first and second movement mechanisms to a specific x-axis and y-axis location in the XYZ coordinate system based upon a tray type for holding work pieces.

13. The device recited in claim 12, wherein the rotatable carrier will rotate to position a pick head of the plurality of pick heads over a work piece upon receipt of signals from the processor.

14. The device recited in claim 13, wherein a pick head of the plurality of the pick heads will extend and grasp or release the work piece upon receipt of signals from the processor.

15. The device recited in claim 14, wherein the plurality of pick heads is equal to the number of work pieces that are positioned in a plurality of trays.

16. The device recited in claim 15, wherein the plurality of work pieces contains 60 work pieces and the rotatable carrier carries 60 pick heads.

17. A rotary pick and place device, comprising:
a plurality of pick heads, wherein each pick head is used to pick up, hold and release a single work piece from a tray;
said tray having a predetermined number of work piece positions;
a rotary wheel having the plurality of pick heads positioned around the circumference of the rotary wheel, the wheel having a number of pick heads equal to the number of work piece positions on the tray;
a movement arm connected to the rotary pick and place device to move the rotary wheel in the x-axis of an XYZ coordinate system;
a screw drive connected to the rotary pick and place device to move the rotary wheel in the y-axis of an XYZ coordinate system;
a processor connected to or embedded in the rotary pick and place device and connected to the screw drive, the movement arm, the rotary wheel, and the plurality of pick heads to position and rotate the rotary wheel by directing the movement arm and screw drive to a specific x-axis and y-axis location in the XYZ coordinate system based upon a tray type for holding work piece to position a pick head of the plurality of pick heads over a work piece in the tray upon receipt of signals from the processor, and initiate the pick up of and placing down of the work pieces by the pick heads wherein a pick head of the plurality of the pick heads will extend and grasp or release the work piece upon receipt of signals from the processor.

18. The device recited in claim 17, wherein the workpiece is a silicon chip and at least one of the pick heads is a suction device.

19. The device recited in claim 17, wherein a camera coupled to the processor is provided for inspection of the workpieces and selected for pickup by the pickheads dependent upon imperfections detected by the camera.

20. A rotary pick and place device, comprising:
a plurality of pick heads, each of which is to pick up, hold and release a single work piece of a plurality of work pieces from a tray wherein a pick head of the plurality of the pick heads
said tray having a predetermined number of work piece positions; will extend and grasp or release the work piece upon receipt of signals from the processor;
a rotatable carrier having the plurality of pick heads positioned thereon, the rotatable carrier having a number of pick heads equal to the number of work piece positions on the tray;
a first movement mechanism connected to the rotary pick and place device to move the rotatable carrier in the x-axis of an XYZ coordinate system;
a second movement mechanism connected to the rotary pick and place device to move the rotatable carrier in the y-axis of an XYZ coordinate system;
a processor operatively coupled to the first and second movement mechanisms, the rotatable carrier, and the plurality of pick heads to position and rotate the rotatable carrier to position a pick head of the plurality of pick heads over a work piece upon receipt of signals from the processor by directing the first and second movement mechanisms to a specific x-axis and y-axis location in the XYZ coordinate system based upon a tray type for holding work pieces to initiate the picking up of and placing down of work pieces by the pick heads.

21. The device recited in claim 20, wherein the plurality of work pieces contains 60 work pieces and the rotatable carrier carries 60 pick heads.

22. The device recited in claim 20, wherein at least one workpiece is moved from a tray to a wash and dry area for processing and back to a tray for further processing or packaging.

* * * * *

UNITED STATES PATENT AND TRADEMARK OFFICE
CERTIFICATE OF CORRECTION

PATENT NO. : 7,052,225 B2 Page 1 of 1
APPLICATION NO. : 10/012342
DATED : May 30, 2006
INVENTOR(S) : Hilario It is certified that error appears in the above-identified patent and that said Letters Patent is hereby corrected as shown below:

On the face page, in field (54), in "Title", in column 1, lines 1-2, after "HANDLING" delete "MASS PRODUCED".

In column 1, lines 1-2, after "HANDLING" delete "MASS PRODUCED".

In column 5, line 53, in Claim 6, after "tray" delete ";".

In column 6, line 40, in Claim 11, after "tray" delete ";" and insert -- , --, therefor.

In column 6, line 45, in Claim 11, after "work" delete "pieces" and insert -- piece --, therefor.

In column 8, line 3, in Claim 19, delete "pickheads" and insert -- pick heads --, therefor.

Signed and Sealed this

Twenty-sixth Day of September, 2006

JON W. DUDAS
*Director of the United States Patent and Trademark Office*